United States Patent [19]

Rand

[11] Patent Number: 4,790,629

[45] **Date of Patent: * Dec. 13, 1988**

[54] VISUAL DISPLAY SYSTEM WITH TRIANGULAR CELLS

[76] Inventor: Michael Rand, 1005 Whiteoak Dr., San Jose, Calif. 95129

[*] Notice: The portion of the term of this patent subsequent to Nov. 18, 2003 has been disclaimed.

[21] Appl. No.: 913,012

[22] Filed: Sep. 29, 1986

Related U.S. Application Data

[62] Division of Ser. No. 679,064, Dec. 6, 1984, Pat. No. 4,622,881.

[51] Int. Cl.[4] .......................... G02B 27/00; A63J 17/00

[52] U.S. Cl. .................................... 350/321; 340/701; 84/464 R; 362/252

[58] Field of Search .................... 350/321; 362/86, 29, 362/235, 246, 252, 367; 40/457; 340/701; 84/464 R

[56] References Cited

U.S. PATENT DOCUMENTS

| | | | |
|---|---|---|---|
| 2,605,386 | 7/1952 | Syretz | 362/252 |
| 3,400,263 | 9/1968 | Yakim | 362/252 |
| 3,806,873 | 4/1974 | Brady | 84/464 R |
| 3,845,468 | 10/1974 | Smith | 84/464 R |
| 3,869,699 | 3/1975 | Haller et al. | 84/464 R |
| 4,056,805 | 11/1977 | Brady | 84/464 R |
| 4,339,787 | 7/1982 | Burnbaum | 362/235 |
| 4,622,881 | 11/1986 | Rand | 340/701 |
| 4,635,050 | 1/1986 | Grothe et al. | 340/701 |

*Primary Examiner*—John K. Corbin
*Assistant Examiner*—Loha Ben
*Attorney, Agent, or Firm*—Kenyon & Kenyon

[57] ABSTRACT

Improvements to visual display units for producing aesthetically pleasing abstract lighting effects which employ light baffles to produce compartments which contain at least three light sources of different colors are disclosed. The benefits of a baffle arrangement defining compartments forming isosceles triangles with adjacent hypotenuses is described. Color range and fidelity are improved by employing four light sources with a combination of relatively broadband pigmented filters of red, yellow, and green and a relatively narrowband interference-type filter of blue. Improvements to the control system for visual display units of this type are also disclosed. A memory means is provided to record desired color values for each compartment in each of a number of patterns. A single arbitrary color number and a separate intensity value are recorded and at least one conversion table is employed to convert the color number and intensity to average power levels for the sources in the display. A keyboard is also provided, together with a memory means in which the lighting effects desired may be specified during a programming phase, whereby during operation the closure of each key will cause the automatic execution of a subroutine causing a preselected lighting effect to be produced.

10 Claims, 6 Drawing Sheets

VISUAL DISPLAY SYSTEM WITH TRIANGULAR CELLS

This is a division of application Ser. No. 679,064 filed Dec. 6, 1984 now U.S. Pat. No. 4,622,881.

This application relates to visual display units for producing aesthetically pleasing abstract lighting effects and to their associated control systems.

BACKGROUND OF THE INVENTION

The abstract play of light and color has always been fascinating, and over the last century a variety of optical, mechanical, electrical, and electronic devices have been disclosed to produce such effects automatically; in response to an audio input; or under the control of an operator.

At the turn of the century, complex effects could only be produced by optical means and "lumia" devices relied on the use of light-varying means such as filters and distorted reflective surfaces as the primary method of producing such effects.

Early non-mechanical systems such as that disclosed in U.S. Pat. No. 1,790,903 employed several circuits of colored incandescent light sources arrayed behind a translucent diffuser, the power supplied to such sources modulated in response to some characteristic of an audio signal. Over time the construction of the display unit has remained substantially similar (e.g. U.S. Pat. No. 3,845,468) but the complexity of the control system has increased. The division of the audio signal into several frequency bands has been the most common technique (e.g. U.S. Pat. No. 1,977,997), and other aspects of the audio signal, most notably the tempo or beat have been used in coordination with frequency-division to increase the complexity of the system's response.

While early systems employed a limited number of sets or circuits of light sources evenly disposed about the display and produced their abstract images solely by modulating the intensity of those circuits, many recent systems have employed two dimensional arrays of light sources in which each source may be separately controlled and the on/off condition of each light source in the array (a "pattern") can be stored in electronic memory for each of a number of such patterns. The lighting effect is therefore produced by the successive recall of patterns in order to form images moving across the surface of the display. The patterns displayed, the rate of movement, and the intensity of the display all may be altered in response to one or more aspects of the audio signal.

In order to increase the variety of lighting effects, recent systems have also employed separate aspects of the audio signal to control the pattern sequence and intensity (e.g. U.S. Pat. No. 3,806,873) and selectively combined two or more patterns by means of NAND (U.S. Pat. No. 4,056,805) or OR gates (U.S. Pat. No. 4,262,338) in order to produce new patterns related to more than one aspect of the audio signal.

It will, however, be recognized that variations in color, potentially one of the most expressive aspects of the lighting effect, are in modern systems, little more than incidental to the sequence of patterns and the modulation of their intensity in response to the audio signal.

It will further be recognized that construction of the display units associated with such systems is also comparatively crude, and that the variations possible in the appearance of the display unit itself (as distinguished from that in the sequence of patterns presented) are extremely limited.

It will also be recognized that while such devices are capable of complex pattern sequences, the determination of those sequences is made on the basis of a pre-programmed response to a given aspect of or given relationship between multiple aspects of an audio signal. No means is provided by which a light artist can exercise real time control in order to produce a light composition which bears a higher order relationship to, for example, a musical composition, one beyond the capability of any frequency, envelope, or tempo detector to duplicate.

It is therefore the object of the present invention to provide an improved visual display unit, whose construction affords a high degree of variety in its appearance, and in the range and subtlety of color effects possible, and further to provide the improvements to the control system required to make full use of these enhanced display capabilities and to permit an operator to exercise a heretofore unprecedented degree of control over a system capable of complex pattern sequence production.

It is a further object of the invention to make these capabilities available within a system which is economical to construct.

SUMMARY OF THE INVENTION

The visual display unit of the present invention achieves these and additional objects through a variety of techniques having synergistic benefits.

The visual display unit of the present invention presents a translucent diffuser surface to the viewer. Light baffles of an opaque material are arranged at right angles to the diffuser surface in order to form a regular pattern of adjacent isosceles triangles, each such triangle or "cell" containing separately controllable light sources. This choice of cell shape affords unique advantages in that a small number of such cells can be illuminated to form a variety of other basic geometric shapes including equilateral triangles, rhombuses, hexagons, and stars.

In order to provide a continuously variable range of color, each such cell includes four incandescent light sources, three provided with relatively broadband filters in red, amber, and green, and the fourth source employing a relatively narrow band interference filter in blue.

Additionally, a pleasing suggestion of a three-dimensional shape is provided by spacing the light source and the diffuser surface such that an uneven distribution of intensity from each light source and therefore a variation in the color mixture or "modeling" across the surface of each cell results.

Additionally, the display unit of the present invention allows the user to adjust the sharpness of the division between cells by adjusting the distance between the edge of the light baffle and the diffuser.

Additionally, the design of the display unit of the present invention also allows the relative spacing between the light baffle and the diffuser surface to be varied across the display surface, such that the blending of adjacent cell boundaries varies.

Additionally, the design of the display unit also allows the use of multiple diffuser surfaces spaced at varying distances to further increase the dimensionality of the effect.

Like prior art systems, the display unit of the present invention provides a means to vary the average power supplied to each light source in each cell, which is responsive to a control system capable of producing preprogrammed patterns.

Unlike such systems, a single value is recorded for each cell corresponding to an arbitrary color number, with a second value representing intensity. The color number and intensity value specify the location in a table where the average power levels are stored for each of the four light sources in the cell which are required to produce the desired color sensation and intensity.

The system of the present invention allows for subtle modulation of cell color in response to prerecorded data; an operator input; or an aspect of an audio signal through the expedient of incrementing or decrementing the color number. It will be recognized that the effect achieved will be determined by the relationship between the power levels and hence color sensations recorded under adjacent color numbers and are therefore limited solely by the imagination of the operator.

In the preferred embodiment, the average power levels for all intensity values of the same color number will produce an identical color sensation regardless of intensity. The combination of a separate color and intensity value with such a table allows intensity to be continuously varied without producing a shift in cell color caused by the inevitable changes in the color temperature of the light sources as the average power supplied to them changes.

Similarly, cell color may be varied widely without a distracting change in intensity.

Additionally, the system of the present invention allows the storage of multiple color tables, such that the table consulted may be varied during operation in response to any one of a number of conditions.

Another aspect of the control system of the present invention resides in a novel method of operation, whereby the operator may exercise real time control over the lighting effects generated.

The control system of the present invention provides an operator input device, typically a piano-type keyboard, whose output is connected to an information processing means. Data as to key closures as well as additional parameters of the closure including velocity, force, and duration are provided to the information processing means. Associated with the information processor means is a memory, in which locations are provided for each key, at which the operator may preprogram the desired results of the closure including the display of a "frame" or pattern or the display of a pattern sequence; the rate at which a pattern display will proceed; the relationship between the pattern sequence and those produced by the operation of other keys; and the modulation of pattern rate, intensity, or color shift in response to a specified condition or relationship between multiple conditions of the operator interface controls or an external input.

The control system of the present invention, therefore, makes available to the operator via the keyboard or other interface device, a very large number of design elements which he may select instantly according to his creative needs, every aspect of which may be specified during the programming phase, yet which will proceed under automatic control once initiated.

Finally, several methods are disclosed whereby the memory, hardware, and processor requirements of the system may be minimized.

DETAILED DESCRIPTION

Figure 1A:
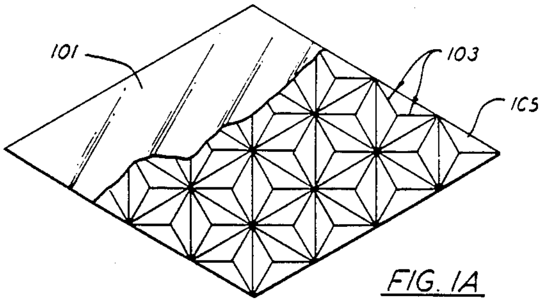
FIG. 1 A is a front elevation of the display unit of the present invention showing the cell geometry.
FIG. 1B is a detail view of a single cell showing the light sources and filters contained therein.
Figure 1B:
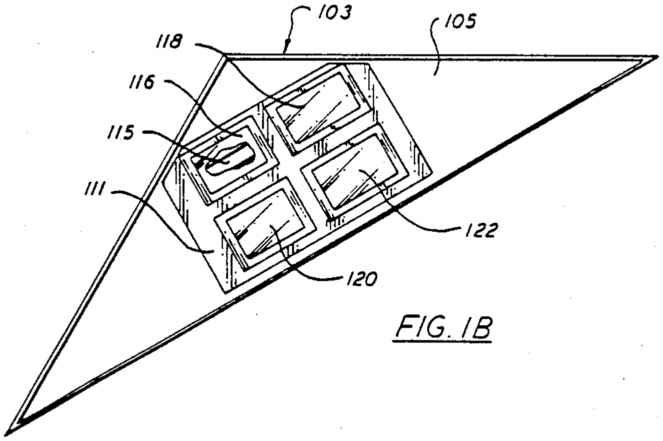

Refer now to FIG. 1A, a front elevation of the display unit of the present invention; FIG. 1B a detail view; and FIG. 3A a section. The viewer is presented with the neutral surface of a diffuser 101, which may be of glass or plastic or other appropriate material. Baffles 103 of a substantially opaque material are located behind the diffuser and at right angles to it, so as to form a series of compartments or "cells" 105, each such cell in the shape of an isosceles triangle, the plurality of such cells forming a regular geometrical pattern in which the hypotenuses of such triangles are adjacent. The corners of each cell may be sharp or radiussed, as desired.

Each cell 105 contains four light sources 115, 117, 119, and 121, preferably low-voltage incandescent bulbs, and each bulb is provided with a filter means, seen here as filter assemblies 116, 118, 120, and 122 (although filter materials may be applied directly to the bulb envelope).

The light sources 115, 117, 119, and 121 are supplied by power control means capable of adjusting average voltage or current in response to a control signal, such as the well-known phase control dimmer. Preferably, the light sources and their dimmers may be mounted to a common mechanical support 111, such as a printed circuit card, connected to the display unit and to conductors supplying power and control signals in a manner which allows ready replacement.

The construction of visual display unit with four-lamp compartments per se was disclosed in U.S. Pat. No. 2,340,559 and is not novel. However, unique benefits obtain from the specific geometry and from the specific combination of color filtering techniques employed by the display unit of the present invention.

Prior art display units fall into two broad categories: One type, such as disclosed in U.S. Pat. No. 3,845,468, employs a relatively large number of light sources on common electrical circuits disposed across the display unit in a fixed pattern, and hence is severely limited in the patterns which may be produced. The second type, such as disclosed in U.S. Pat. Nos. 2,340,559 or 4,262,338, employs light sources each on an individually selectable electrical circuit, and hence a very much larger number of patterns may be produced by energizing the appropriate combination of individual sources. However, like any dot-matrix display, prior art systems of this type have been severely limited in their ability to produce recognizable shapes by the problem of resolution. That is, geometric shapes cannot be generated using circular display elements without both a very large number of such elements and a considerable distance between the unit and viewer. Thus prior art displays have severely limited the ability of the designer to exploit his individual control of light sources in order to create recognizable geometric shapes.

The display geometry of the present invention, however, offers unique advantages in the number of geometric shapes and effects which may be produced by a very limited number of light sources with perfect resolution.

Figure 2B:
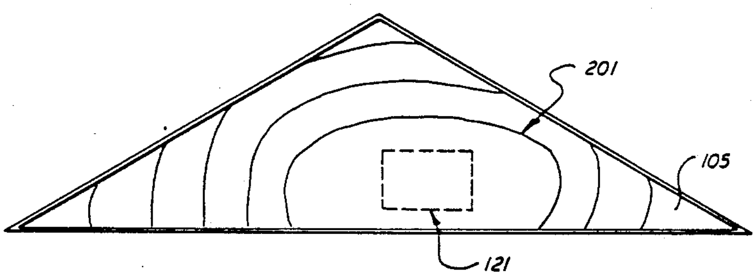
FIG. 2B illustrates the unequal intensity distribution from a single source, which results in the effect of three-dimensional modeling.
Figure 2A:
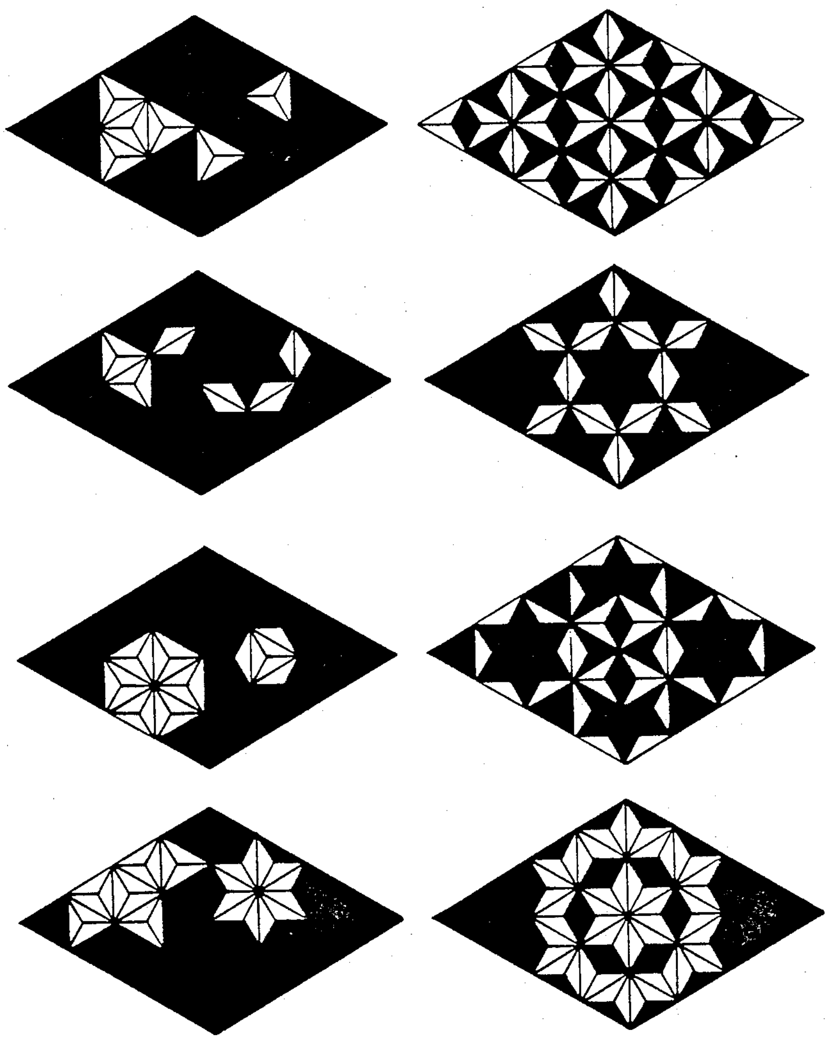
FIG. 2A illustrates various geometric shapes which may be produced by the cell geometry of the present invention.

Referring to FIG. 2A, it will be seen that only three cells need be illuminated to produce an equilateral triangle, and that progressively larger such triangles can be produced by lighting additional cells. Only two cells need be illuminated to produce a rhombus, and progressively larger such figures can also be produced by lighting additional cells. Six cells produce a hexagon, and again, hexagons of increasing size can be produced with additional cells. A six-pointed star can also be generated with twelve cells, as well as in larger sizes.

Thus the display geometry of the present invention affords the designer the ability to produce the arbitrary patterns of prior art systems, but also the ability to generate a variety of recognizable geometric shapes with perfect resolution using a very limited number of display cells.

Further, the display geometry of the present invention also offers unique motional effects, including the ability to scale such shapes up and down, and to rotate them about effective pivot points anywhere on the display.

As previously noted, prior art control systems have also made comparatively limited use of color. As the subtle modulation of color is an important object of the invention, the display unit of the present invention employs a combination of color filtering techniques which has been found to reproduce the color spectrum with unusual fidelity. The red, yellow, and green light sources 115, 117, and 119 employ pigmented filter materials 116, 118, and 120 (such as produced by Rosco Laboratories, Port Chester, N.Y.) affording relatively broadband response. The blue light source 121, however, employs a relatively narrowband interference-type filter material 122 (such as produced by Optical Coating Laboratories, Santa Rosa, Calif.

The benefits in color fidelity are achieved only with this combination of filtering techniques. The use of broadband filters for all light sources results in limited color purity in the blue range. The use of narrowband interference-type filters for all colors produces uneven response at the longer wavelengths.

The appearance of the display unit of the present invention is further improved by the "modeling" of each cell to create a pleasing impression of three-dimensionality. This effect is produced by mounting the light sources 115, 117, 119, and 121 at a relative distance from diffuser 101 such that the distribution of light from each such source over diffuser surface 101 is uneven, as is illustrated in FIG. 2B in the case of light source 121, by lines such as 201, illustrating points of equal illumination. The degree of variation can be adjusted by changing the relative spacing between the light sources and the diffuser as well as by the use of a method of supporting the filter materials over the light sources which produces a restricting mask or aperture. The relative offset between such sources on mounting support 111 results in color mixtures produced by illuminating multiple sources being substantially constant in the central area of the cell, but varying along its boundaries towards the color of the nearest source. This imperfect color mixture, which is at odds with the object of prior art display units, imparts an impression of three dimensional shape to each cell and produces a pleasing complexity to the appearance of the display unit as a whole not present in prior art designs.

Figures 3A, 3B, 3C:
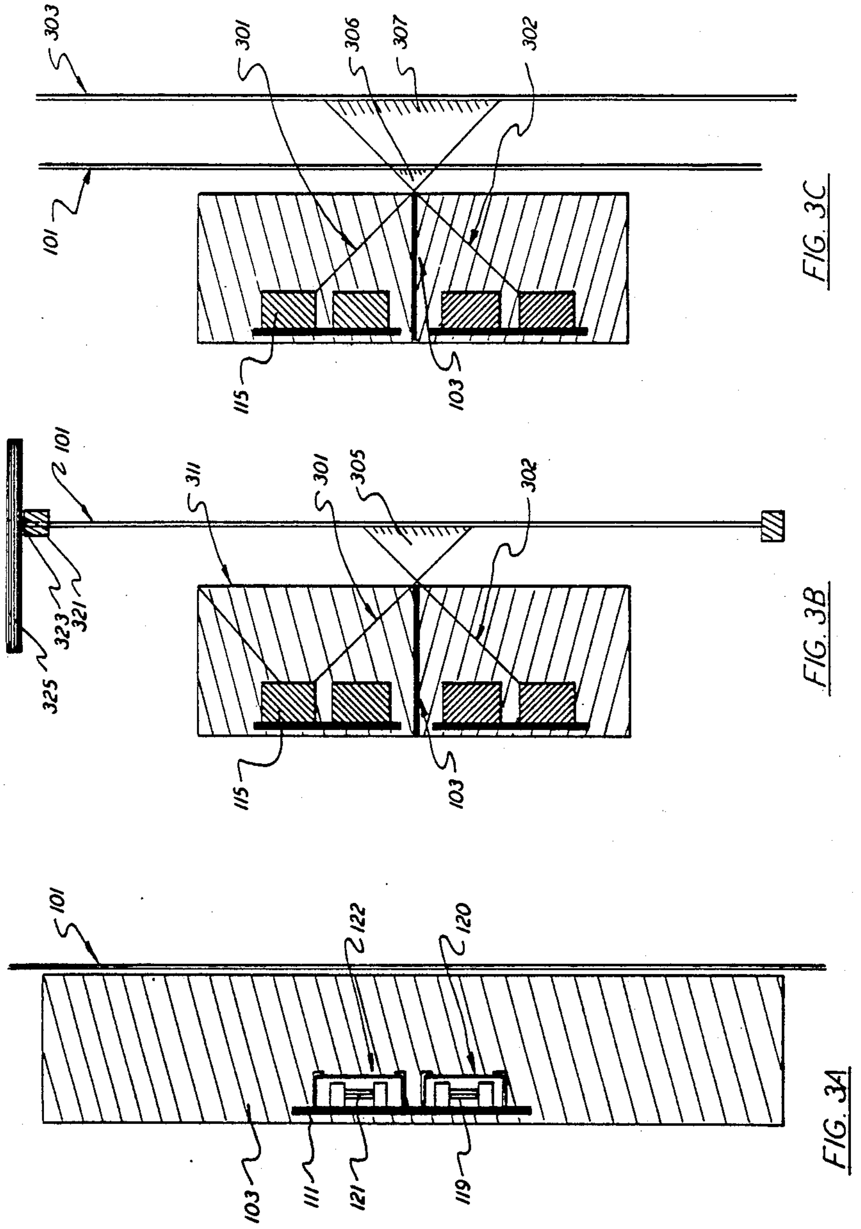
FIG. 3A is a sectional view of cell construction.
FIG. 3B is a sectional view illustrating the blending effects of diffuser spacing.
FIG. 3C is a sectional view illustrating the effects of employing multiple diffusers.

Further, the display unit of the present invention allows the user to adjust the sharpness of the division between cells. Referring to FIG. 3B, diffuser 101 may be mounted so as to be moveable with respect to the light baffles 103. Frame 321 supporting diffuser 101 is mounted to a carrier 323, which rides along track 325 perpendicular to the plane of the display. Referring to FIG. 3B, the diffuser may be moved to create a space between the edge of the light baffles 103 and the diffuser surface. As will be apparent by examining the path of ray 301 from light source 115, light from the sources within a given cell will pass beyond the projected boundary of the light baffles 103 to overlap the area of the diffuser 101 belonging to the adjacent cell and vice versa. Similarly, rays such as 311, reflected from the light baffles themselves, which are normally trapped within the compartment will extend even farther than the direct rays from the light source. The result will be an apparent blending of the boundaries of adjacent cells to produce a "soft focus" display appearance, the degree of blending being readily varied by adjusting the distance between the diffuser surface and the baffles.

It will be recognized that a similar effect can be achieved by employing light baffles which while extending to the diffuser surface are opaque near the light sources but transparent or translucent towards the diffuser.

It will also be recognized that by varying the distance between the light baffles and the diffuser across the display, whether by curving the display surface; by employing baffles of variable height; or by a combination of the two techniques, a pleasing variation in "focus" across the display may be achieved such that, for example, the cell pattern is in relatively sharp focus at center and loses focus towards the edges.

A further means to vary the appearance of the display unit employs a plurality of diffuser surfaces at different spacings. Referring to FIG. 3C, diffuser 101 has been placed in close proximity to the baffles 103, while diffuser 303 has been spaced at a greater distance. The result is that ray 301 relatively clearly defines the sharp edge of baffle 103 on diffuser 101 while simultaneously producing a blending effect on diffuser 303. A viewer of the display sees both effects superimposed, and a more complex appearance results.

The display unit of the present invention may be employed with any type of prior art control system. The intensity of its color sources may be modulated by one or more components of an audio signal or switched by a manual keyboard. Similarly, it may be employed with a control system storing and selectively recalling patterns in response to an audio signal as disclosed in either U.S. Pat. Nos. 4,056,805 or 4,262,338.

In most embodiments of such systems, the on/off condition of each light source is stored separately and the color effects which are created are a byproduct of the interaction between patterns and/or modulation of the intensity of all light sources of a color in response to an aspect of an audio signal.

Unlike such systems, the control system of the present invention affords several novel aspects to the storage of data and to the modification of stored data during operation so as to produce both practical benefits and control over color effects not present in prior art systems.

Figure 4:
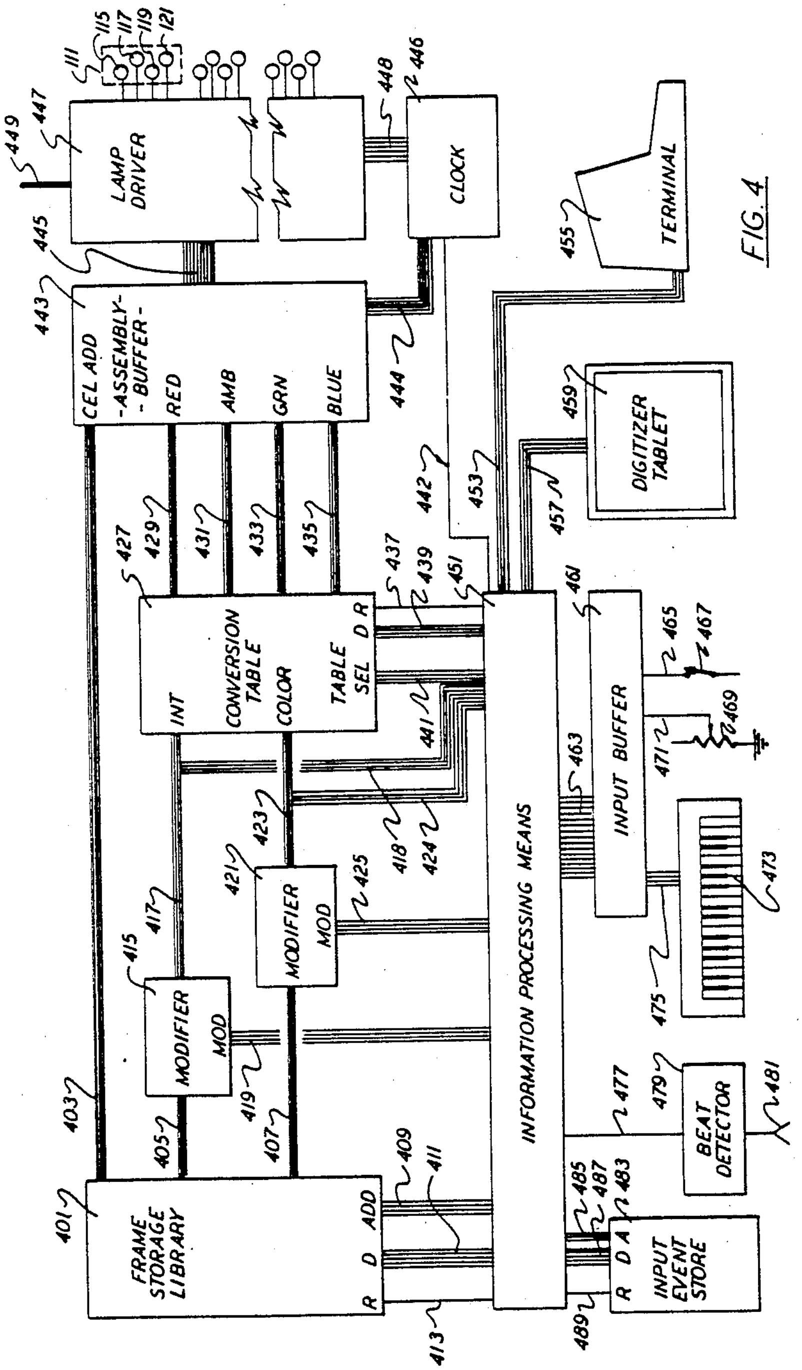
FIG. 4 is a block diagram of the control system of the present invention.

Refer now to FIG. 4, a block diagram of the preferred embodiment of the control system of the present invention.

The light sources of the display unit, such as sources 115, 117, 119, and 121 previously described are supplied from lamp driver means 447, which includes both the phase control dimming means regulating the average voltage or current supplied to the light sources from power supply 449 (and as such their brightness) as well as serial-to-parallel conversion means required to adapt the output of the control system. The design of such circuits has been disclosed in various U.S. patents including U.S. Pat. No. 4,262,338.

The condition of each light source in a pattern or "frame" is stored in frame storage library 401 during the programming phase. Using terminal 455 or an equivalent input device, the operator specifies the identifying number of the frame, and using the digitizer tablet 459 or other device, indicates the cells to be illuminated in that frame. During this adjustment, the frame is displayed to allow the operator to make corrections. The operation of such input systems is well understood and disclosed in various U.S. patents including U.S. Pat. No. 3,766,528.

In addition to selecting the cells to be illuminated, the operator may specify both the color and intensity of each cell by means of an input device. However, unlike prior art systems, the cell intensity and color are specified not by recording a separate value for each light source within the cell, but by recording for each cell, a single color number which bears no fixed relationship to any combination of average power levels provided to the light sources. In addition, a second value corresponding to intensity is recorded for each cell. The benefits of this system will become clear as the operation of the system is further described.

Unlike prior art systems, the light source data stored in memory is not provided to the lamp driver means in its original form. Instead, a second memory means, the conversion table 427, is interposed between the output of the frame storage library 401 and the system output.

The color number and the intensity for each cell are supplied via 417 and 423 to conversion table 427, where they serve to specify the location in memory at which the values corresponding to the average light source power levels required to produce the desired color and intensity are located, which are then provided to the lamp driver means 447.

In the present embodiment, the operator may choose from 64 color numbers and 4 intensity values. These are typically arranged in a gradually changing color progression similar to that seen in a spectrum display. The color produced by any combination of a color number and an intensity may be specified by the operator during the programming phase in a manner very similar to frame storage. The color number and intensity are entered via terminal 455 and the information processor means 451 provides this data to the appropriate inputs of conversion table via 418 and 424. The operator then adjusts input devices such as potentiometer 469 to adjust the average power values stored at that location in conversion table 427 via data buss 439 while observing the display until the desired effect has been obtained. The operator then enters a record command which causes the information processor means to provide a "Write" signal via 437 to the Record input of the conversion table.

One benefit is a reduction in memory requirements as only one eight-bit color number serves the same function as four eight-bit average power values.

Another benefit is the ability to store average power levels for each color number such that the intensity of the cell remains essentially constant despite variations in color.

A particular benefit is the unprecedented degree of control offered over the effect achieved by real-time modifications of the stored value. Because the stored color data is not representational of specific average power levels, the effect of a given modulation of the recorded value either in response to an audio signal or to a manual input is limited only by the imagination of the operator. By recording average power values in the conversion table for the numerical sequence of color numbers which produce a continuous variation in cell color from one end of the spectrum to the other, the result will be a color shift of the cell in response to a variable input where input value equals frequency. However, by recording other average power values producing non-continuous color shifts for numerical sequences of color numbers the effects of a variable input may be highly complex.

Preferably, the capacity of conversion table 427 is also sufficient to allow storing multiple tables, so that the operator may select not only color number and intensity, but choose from among several tables, via selector lines 441, and as such, the effect of a given input variation on cell color.

Similarly, the use of a separate intensity value has several benefits.

The intensity of the cell may be varied by simultaneous adjustment of the average power supplied to all light sources but this prior art method has a major disadvantage. As average power supplied to an incandescent light source is reduced, its color temperature shifts, that is, the proportion of red and amber frequencies relative to the cooler colors increases. A single light source reddens, but in a system which employs multiple sources which are selectively filtered the result is more pronounced as the red shift of the red-filtered light source has no relative effect on the amount of light transmitted, while the red shift of the blue-filtered source results not only in reduced output due to dimming, but to losses as the frequency distribution of its output slews towards those frequencies blocked by the filter. The result is that a nominal reduction in the intensity of a cell in a color produced by a mixture of multiple sources actually results in a change in the color itself.

The system of the present invention, however, provides a mechanism to compensate for this effect. By recording for each intensity value of a given color number a combination of average light source power levels which produce an identical color sensation by increasing the relative proportion of green and blue at reduced intensities, the result of modifying the cell intensity value is a change in cell intensity without the undesirable shift in cell color of prior art systems.

It is also, of course, possible for the operator to so program the conversion table that the average power levels recorded for different intensity values of the same color number produce radically different color sensations and thus the modification of the color number in response to one input and the modification of the intensity value in response to another produces an extremely complex effect.

The benefits of the system of the present invention are the result of its basic principles and many approaches to the design of suitable hardware and software are practical.

In particular, the operation of the color number modifier 421 and the intensity modifier 415 may involve a pure software approach whereby, under the control of the processor, the color number and intensity value are fetched from the frame storage library 401, and a digitized value representing the desired degree of modification from the appropriate input device, an audio analysis unit, or a preprogrammed instruction. The modifying operation is thus performed by the processor and the resulting values used to specify conversion table data in the manner described.

Figure 5:
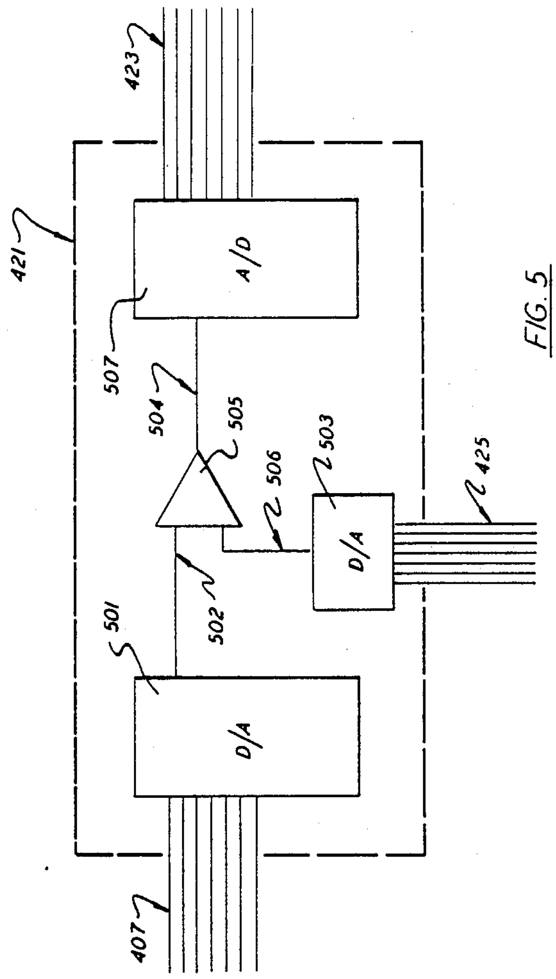
FIG. 5 is a diagram of one embodiment of a hardware modifier.

However, to reduce the processor requirements of the system and as such its cost, it may be preferable to perform the modification by means of a hardware device. Refer now to FIG. 5 where one such hardware modifier is illustrated.

The color number is provided from frame storage library 401 to color modifier 421 via 407 in digital form. Digital-to-analog convertor 501 converts the color number into a corresponding analog value which serves as one input, via 502, to a differential operational amplifier 505. The modifier value, also in digital form, is similarly provided via 425 to digital-to-analog convertor 503, which produces an analog value corresponding to its input, which is provided via 506 as the second input to amplifier 505. The output of operational amplifier 505 is provided via 504 to analog-to-digital convertor 507, whose output serves as the color input to the conversion table. As will be seen, variations in the color modifier input will cause differential amplifier 505 to effectively vary the color number output with respect to its input. While a system performing this modification in the analog domain is illustrated, it will be understood that it equally possible to perform it with digital hardware.

It should be specifically understood that the input or data used for the modification may be from any source or combination of sources including aspects of the audio signal as processed by any one of the prior art methods disclosed; by a manual control; or by an internal program instruction or pattern generator which is either independent or responsive to an external input.

It should also be understood that while the improved system of the present invention is limited to modification of encoded color numbers prior to conversion, that prior art modification of the resulting average power levels may also be performed.

Another aspect of the control system of the present invention resides in an improved method of operation whereby the operator may exercise an exceptional degree of real time control.

Prior art systems which are capable of complex pattern generation such as disclosed in U.S. Pat. Nos. 4,056,805 and 4,262,338 afford, through programming, a high degree of control over the operation of the system in response to a given aspect of an audio signal. Yet in operation, these systems are automatic, affording little or no control for an operator over the lighting effects produced Conversely, most prior art display units which provide for real time operator control, such as that disclosed in U.S. Pat. No. 3,609,751, afford only the most limited range of control options.

It is an object of the control system of the present invention to provide a control system which affords both preprogrammable pattern sequences and input-aspect-to-modifier relationships of the greatest complexity, with an operator interface which allows a high degree of control over operation.

Referring again to FIG. 4, the various elements of such a system are illustrated.

Control of the system is maintained by an information processing means 451, typically a processor. The information processor means accepts as inputs the condition of devices including a terminal 455 for use during programming; a digitizer tablet 459 for entering patterns or "frames"; a piano-type keyboard 473; and various front panel controls such as potentiometer 469 and switch 467. All of these components are conventional and may be assembled from commercially-available products. In addition, specialized audio processing circuitry 479 to produce outputs corresponding to amplitude, frequency distribution, envelope, and tempo as is well-established in the art may be provided. Input buffer means 461 is preferably provided for those controls used during the performance phase in order to reduce the amount of processor time devoted to polling input device conditions.

The information processing means is, of course, provided with its own operating system, as well as additional memory means.

One is the frame storage library 401 which, as previously described, maintains cell condition in each pattern or "frame". Successive recall of frames will produce a sequence.

Another is the conversion table 427 which maintains stored average power values for each light source in a cell required to produce the desired color sensation for a given color number and intensity value.

Another is the input event store 483 whose operation will be explained more fully below.

It will be recognized that separate memory devices may be employed for each described memory means, or separate locations in a common device may be employed.

The information processor means 451 maintains operative control over all these memory means to enter and recall data via their associated address lines 409, 418, 424, 441, and 485; their data lines 411, 439, and 87; and their record lines 413, 437, and 489. During the programming phase, information entered via the input devices is transferred to the appropriate locations in these memories under the control of information processor means 451.

Input event store 483 provides a memory location for each key of keyboard 473 or an equivalent input device. During the programming phase, the operator may specify for that key closure, the number of any frame stored in frame storage memory 401. When, during the performance, the operator depresses that key, its closure will be noted at input buffer 461. When the information processing means 451 next polls the state of the input devices via buffer 461, notice of key closure will cause it to consult the location in input event store 483 where the subroutine called for that key closure is stored. Upon consulting that subroutine, the information processor means 451 is directed to the appropriate address in frame storage library 401 where the desired pattern is stored, and via address lines 409, causes the color numbers and intensity values stored at that location to be read out via lines 405 and 407 for modification, conversion, and display.

It will, however, be recognized that the combination of a system operating under the control of an information processor means; the provision of all inputs to that means in digital form; its control over recorded data; and the use of an external operator input to execute a subroutine allows the operator to initiate a lighting effect of unlimited complexity with a single keystroke.

The subroutine for a given key stored in input event store 483 may specify not just a single frame but a sequence of frames, giving the address of the first frame and last frame in the sequence. Instructions may be recorded as to the rate at which the sequence proceeds or the external input (such as beat detector 479) or front panel control (such as switch 467) used to advance it. Similarly, the operator may specify in the subroutine the factor, input, or control modifying color or intensity and the degree and direction of change. Similarly, the operator may specify whether the sequence will proceed only as long as the key is depressed or until completion and if repetition is allowed, whether the sequence restarts or reverses.

It is a further feature of the control system of the present invention that the input keyboard 473 is of the type such as the Veloci-Touch keyboard (produced by Paia Electronics, Oklahoma City, Okla.), which generate not only outputs for key closure, but additional data corresponding to the force and velocity of closure and that these values may be used to modify the rate, intensity, or color shift of the frame or sequence displayed, affording additional expressive control for the operator.

The system of the present invention also permits the operator to initiate multiple subroutines, that is, the to display the results of multiple key closures simultaneously, and to specify the relationship between the effects or patterns produced by each.

While the relationship between the effects of multiple subroutines may be resolved in software, a more practical system may employ a memory means such as assembly buffer 443 in which a separate memory location is provided for each light source.

Each second is divided into a number of refresh cycles, during which the display condition is updated. At the start of each refresh cycle, assembly buffer 443 is cleared. The average power levels for all sources energized by the pattern called by the first subroutine are written into their corresponding locations in the assembly buffer.

If a second subroutine has been called, the information processor means 451 will check the location for each source energized in the pattern prior to writing in the pattern's average power levels, the operation of the information processor means determined by either preprogramming or a front panel control.

The system may merge the two patterns, writing power levels from the second pattern into all locations unused by the first while summing the levels for all light sources used in both patterns. This mode provides a geometric increase in the range of possible colors being displayed at once because of the additive effects of combining two different color values in the same cell.

The system may also superimpose one pattern over the other by writing power levels for the second pattern into all locations unused by the first and employing the new or the old value for all sources used in both patterns depending upon which has priority - is considered to be "on top". Priority may be determined by a value within the subroutine or by the order of closure, or by an external input.

Further, the system may use one pattern to mask the other, by zeroing the power levels for all sources which appear in both patterns. In either of the previous two modes of combining patterns, the effect achieved serves to further increase the apparent depth and three dimensionality of the patterns being displayed.

After the assembly of the completed display pattern representing the various active patterns and effects, the appropriate light source power levels are written from the assembly buffer 443 to the lamp driver means 447 via 445 at high speed and preferably under hardware control in order to minimize processor time spent in outputting. FIG. 4 accordingly illustrates hardware clock 446. At the completion of each refresh cycle, the information processor means 451 provides a start command to hardware clock 446 via line 442. Clock 446 then provides address information to assembly buffer 443 and to the serial-to-parallel conversion circuitry which is a part of lamp driver 447. While the hardware-driven transfer of the completed display pattern is taking place, information processing means 451 is free to perform other tasks, such as the polling of its input devices.

The system of the present invention also employs an improved method for storage of pattern data which results in a significant decrease in memory requirements. In contrast to prior art systems which employ pattern storage means capable of recording the condition of each light source by means of a memory-mapped display in which each source is provided with a unique location in memory for each pattern, the system of the present invention employs an active memory scheme in which only energized cells or sources are recorded. This requires that each recorded be identified with an associated cell number, in total memory requirements over a memory-mapped system are considerable.

In the embodiment illustrated in FIG. 4, the cell number is stored with the color number and intensity and the appropriate data lines provided via 403 as an address input to assembly buffer 443, such that when information processing means 451 causes frame storage library 401 to output the color number and intensity of a given cell, that the address corresponding to the appropriate light source locations is provided to assembly buffer 443.

Clearly the system of the present invention can produce operator initiated effects of unprecedented complexity and resolve the relationship between concurrent effects to a level limited only by the available processor power. The system of the present invention is, however, exceptionally simple to operate during the performance phase and indeed, can be employed by individuals with no previous experience in programming to produce exciting and pleasing displays.

I claim:

1. An improved lighting effect system comprising, (a) a visual display unit including:

i. a diffuser surface ii. a plurality of compartments each containing at least three discrete light sources, each adapted to produce a different color, and each accepting a power input;

(b) dimming means for each of the light sources in each of the plurality of compartments, each such dimming means having a signal input, and varying the average voltage or current supplied to the power input of said each of the light sources between at least two values in response to the value present at said signal input;

(c) first memory means for storing a first value for each of the plurality of dimming means for each of a plurality of desired display conditions;

(d) a keyboard with a plurality of discrete actuators for an operator and having an output;

(e) a second memory means with a plurality of locations for storing second values corresponding to each of the plurality of discrete actuators of said keyboard;

(f) input means for specifying said first value; and (g) information processing means coupled to said output of said keyboard and said first and second memory means whereby the closure of at least one of said discrete actuators will cause said information processing means to consult said location in said second memory means and output to said dimming means a plurality of first values from said first memory means for each of the plurality of said dimming means, in accordance with data at said locations of said second memory means, whereby said display unit sequentially produces at least a first and a second display condition.

2. Apparatus according to claim 1, wherein the time interval between said first and said second display conditions may be varied.

3. Apparatus according to claim 2 and having at least one input from an external variable signal source, wherein said interval may be varied in response to said input.

4. Apparatus according to claim 2, wherein a value corresponding to said interval may be stored in a memory means.

5. A lighting effect system comprising, (a) a visual display unit including:

i. a diffuser surface ii. a plurality of compartments each containing at least three discrete light sources, each adapted to produce a different color, and each accepting a power input;

(b) dimming means for each of the light sources in each of a plurality of compartments, each such dimming means having a signal input, and varying the average voltage or current supplied to the power input of said each of the light sources, within a range of values in response to the value present at said signal input;

(c) at least one memory means for storing a plurality of value sets, each of said value sets corresponding to the adjustment of the luminous condition of each of said plurality of compartments of said visual display unit required to produce a desired display condition;

(d) means for entering values corresponding to said desired luminous conditions of said compartments;

(e) means, coupled to said memory means for storing and to said means for entering, cooperating with said memory means for storing and with said means for entering, to store said values entered by said means for entering in said memory means for storing, and further for identifying at least one desired display condition with which said values are to be associated;

(f) at least one input means having an output and capable of producing a plurality of output conditions at said output;

(g) means for specifying a plurality of sequences, each of said sequences comprising a plurality of display conditions to be associated with one of said output conditions of said input means;

(h) means, coupled to said means for specifying, for maintaining a record of said sequences; and (i) means, coupled to said means for maintaining, to said means for storing, to said input means, and to said signal inputs of said dimming means, for supplying to said dimming means the values required to produce said luminous conditions of said compartments of said visual display unit required to reproduce each of said desired display conditions in a sequence upon receipt of each of said output conditions associated with each of said sequences from said input means.

6. Apparatus according to claim 5, wherein said input means comprises a plurality of manually-actuatable regions.

7. Apparatus according to claim 5, wherein said input means comprises a keyboard.

8. Apparatus according to claim 5, wherein said input means comprises an external device.

9. Apparatus according to claim 5, and further including means, cooperating with said means for supplying, and coupled to a variable signal source, for modifying the luminous conditions of said compartments in said display conditions in response to said variable signal source.

10. Apparatus according to claim 5, and further including means, cooperating with said means for supplying, for varying the time interval between the display of successive display conditions in said sequence.

* * * * *

UNITED STATES PATENT AND TRADEMARK OFFICE

CERTIFICATE OF CORRECTION

PATENT NO. : 4,790,629

DATED : December 13, 1988

INVENTOR(S) : Michael Rand

It is certified that error appears in the above-identified patent and that said Letters Patent is hereby corrected as shown below:

Column 9, line 48, after "it", first appearance, insert --is--.

Column 10, line 54, change "87" to --487.

Column 12, line 44, after "recorded" insert --cell value--.

Column 12, line 45, after "number," insert --but the savings--.

Signed and Sealed this

Twenty-fifth Day of July, 1989

*Attest:*

DONALD J. QUIGG

*Attesting Officer*

*Commissioner of Patents and Trademarks*